Sept. 23, 1924.
A. R. SPIKINGS
FAUCET
Filed July 27, 1923
1,509,268
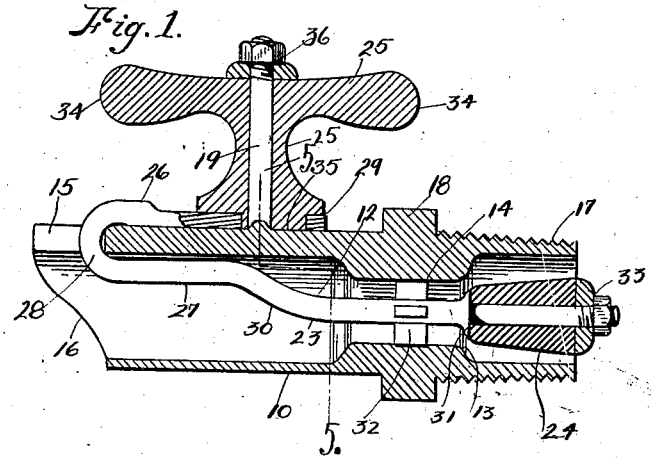
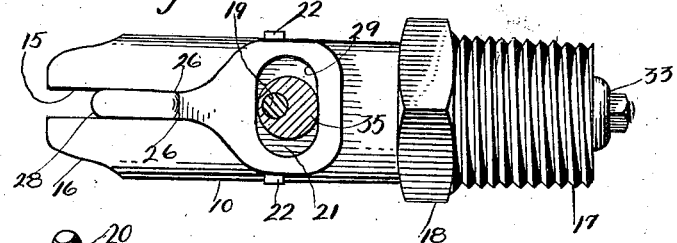
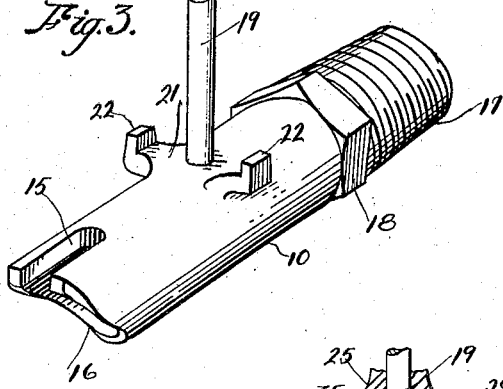
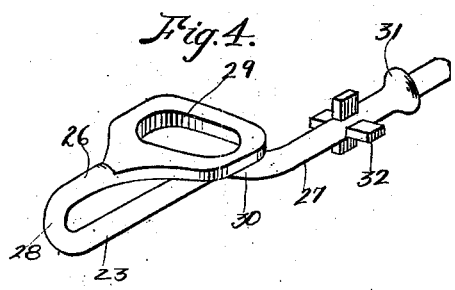
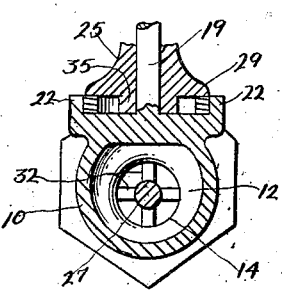
Albert R. Spikings,
INVENTOR.
BY Victor J. Evans,
ATTORNEY.

Patented Sept. 23, 1924.

1,509,268

UNITED STATES PATENT OFFICE.

ALBERT RICHARD SPIKINGS, OF LAKE PLACID, NEW YORK.

FAUCET.

Application filed July 27, 1923. Serial No. 654,201.

*To all whom it may concern:*

Be it known that I, ALBERT R. SPIKINGS, a citizen of the United States, residing at Lake Placid, in the county of Essex and State of New York, have invented new and useful Improvements in Faucets, of which the following is a specification.

This invention relates to faucets.

Some of the objects of the present invention are: to produce a comparatively simple, inexpensive and thoroughly efficient and effectual faucet; and to obviate the use of a stuffing box and other extra parts such as nuts and caps and the machine work required. With these and other objects in view the invention resides in the particular provision, relative disposition and operation of the parts hereinafter fully described in the following specification and illustrated in the accompanying drawing, in which:

Figure 1 is a longitudinal sectional view through the faucet.

Figure 2 is a sectional plan view.

Figure 3 is a perspective view of the valve casing.

Figure 4 is a perspective view of the valve stem.

Figure 5 is a transverse sectional view on the line 5—5, Figure 1.

Referring now more particularly to the several views of the drawing it will be apparent that the faucet of the present invention, generally, comprises a valve casing 10, and valve means 11 operable essentially by virtue of the casing 10 and its particular construction.

The valve casing 10 is a casting and is formed to provide a passage 12 therethrough; a valve seat 13 at and beyond which the wall of the casing is thicker than the remaining portions of the casing, as at 14; a cut-out 15 at the end of the casing which is cut-away as at 16; a screw threaded end 17 which with the nut 18 serve as an attaching means; a stub shaft 19 screw threaded as at 20; and a widened flat portion 21 having guide lugs or projections 22.

The valve means 11 includes a cast stem 23, a valve member 24, and a handle 25 which is cast. The stem 23 has portions 26 and 27 on a bend 28. The portion 26 is wide and flat and has an elongated opening 29 therein. The portion 27 is off-set as at 30, and has a shoulder 31 and lateral projections 32 which are also radially disposed.

The valve member 24 may be of any preferred make and is arranged on the extremity of the portion 27 between the shoulder 31 and a washer and nut 33 on the screw threaded part. The valve member 24 is arranged on the portion 27 of the stem after the same has been properly positioned with respect to the casing; the bend 28 being disposed in the cut-out 15 and thus aids to cause the stem to move properly when moved. In the movement of the stem 23 the member 24 coacts with the seat 13 to permit or prevent the flow of fluid through the passage 12. The handle 25 has a central bore, finger pieces 34, and an eccentric 35; the pieces 34 and eccentric 35 being integral parts of the handle. The handle is arranged on the stub shaft 19 by virtue of the bore therethrough and is held in place thereon with the eccentric 35 in the opening 29 in the portion 26 of the stem, by virtue of a washer and nut 36 on the screw threads 20.

With the several parts assembled as explained in the foregoing, it will be manifest that by turning the handle 25 the valve member 24 may be moved into engagement with the seat 13 to prevent the flow of fluid, and may be moved out of engagement with the seat 13 to permit the flow of fluid. The lugs 22, portions of the casing at the cut-out 15 and the projections 32 serve for guiding the stem in its movements and for the proper operation of the eccentric.

What is claimed is:

1. A faucet comprising an open ended casing having attaching means and a valve seat therein, a freely movable valve stem a portion of which extends exteriorly of said casing, means for guiding the valve stem in its movements, a valve member carried by said valve stem which coacts with said valve seat to permit or prevent the flow of fluid through said casing, and means for effecting the movement of said valve stem to cause the coaction of said valve member with said valve seat, said means including a valve actuating handle formed with an eccentric which coacts with a slot formed in the exterior portion of said valve stem.

2. In a faucet, an open ended valve casing having a spindle forming an integral part thereof, and a valve stem actuating handle having an eccentric forming an integral part thereof rotatably surrounding said spindle, said eccentric coacting with portions of said valve stem in the movement of the latter.

3. In a faucet, an open ended valve casing having a spindle, a valve member carrying stem having integral guiding projections which coact with the wall of said casing for guiding said stem in its movements, and an operating handle rotatably surrounding said spindle and connected to said stem for effecting the movement of the latter.

In testimony whereof I have affixed my signature.

ALBERT RICHARD SPIKINGS.